Dec. 27, 1932.  C. E. SMELSER  1,892,541
AUTOMATIC BRAKE CONTROL
Filed May 7, 1932

INVENTOR,
Chester E. Smelser,
By Minturn & Minturn,
Attorneys.

Patented Dec. 27, 1932

1,892,541

UNITED STATES PATENT OFFICE

CHESTER E. SMELSER, OF SHELBYVILLE, INDIANA

AUTOMATIC BRAKE CONTROL

Application filed May 7, 1932. Serial No. 609,786.

This invention relates to the art of brakes and particularly to a type of brake adapted to be applied to a fishing reel to prevent the over-running of the spool thereof so as to prevent back-lashes. It is a primary object of my invention to provide a braking structure in which the revolving member may be retarded or released at will without applying or causing to be applied an end thrust on that member. An important object of the invention is to employ a disk type of brake mechanism as opposed to the encircling band type.

Figure 1:
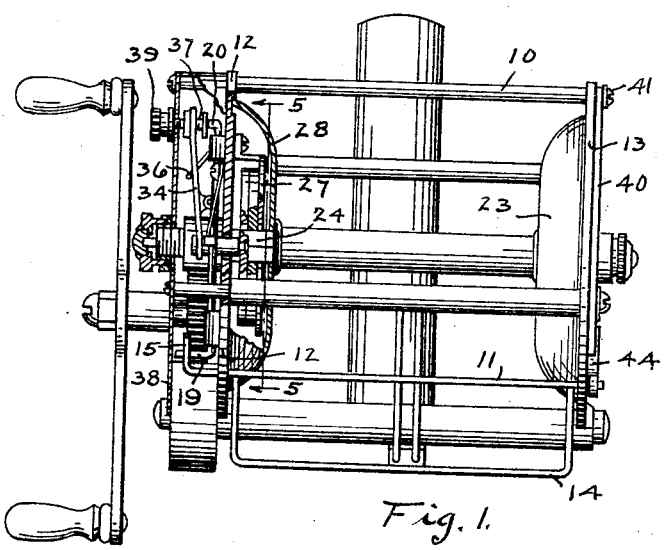
Figure 5:
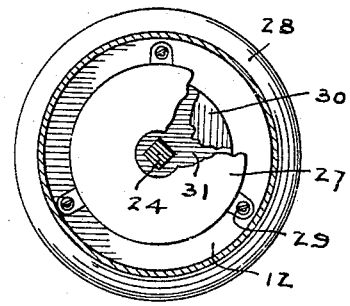
Figure 4:
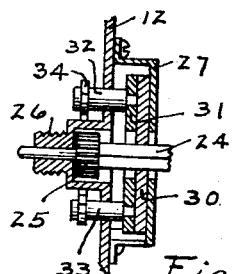

My invention also provides a quick brake release so that in the case of the fishing reel, the line may be wound on the spool without having to turn the spool against the drag of the brake. Further objects and advantages of the invention, such as the extreme simplicity and compactness of the structure, will become apparent to those versed in the art by the following description which is made in reference to the accompanying drawing, in which Fig. 1 is a fragmentary top plan view of a reel to which my invention is applied, Fig. 2, a left hand side elevation of the reel, Fig. 3, a fragmentary right hand side elevation of the reel, Fig. 4, a detail in longitudinal section on the line 4—4 in Fig. 3, and Fig. 5, a vertical transverse section on the line 5—5 in Fig. 1.

Like characters of reference indicate like parts throughout the several views in the drawing.

The reel, generally designated by the numeral 10 is here shown as being of the level winding type which feature may be or may not be employed in conjunction with my invention without effecting the invention in either case. Across the forward side of the reel is placed a shaft 11 to extend rockably through the head plate 12 and tail plate 13 and a bail wire 14 is fixed to the shaft 11 to be revolved therewith and to extend forwardly in the usual and well known manner in the construction of a reel having the anti-backlash feature. The shaft 11 is continued on through the head plate 12 for a slight distance and is turned angularly to form a short arm 15 to be parallel to the face of the plate 12. This arm 15 is here shown to extend rearwardly from the shaft 11 and to be in the same plane as that of the bail 14.

Figure 2:
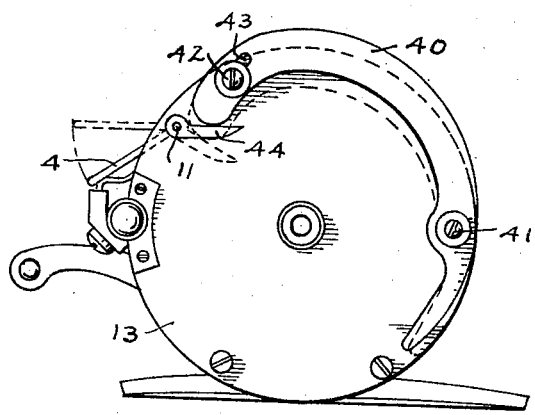
Figure 3:
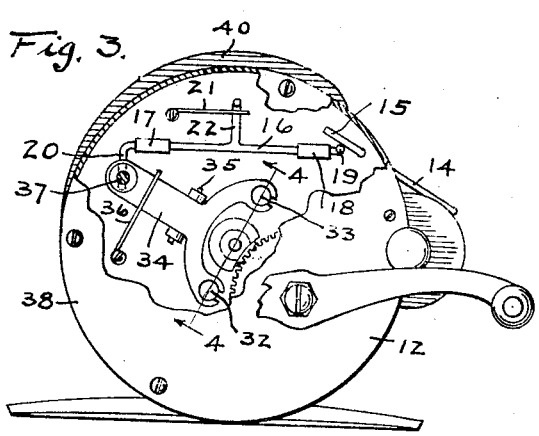

On the outer face of the head plate 12, I rockably mount a shaft 16 to extend through the bearings 17 and 18. This shaft 16 is carried well toward the top of the plate and has a forward out-turned arm 19 to be in the path of the arm 15. The rear end of the shaft 16 is turned downwardly to be disposed substantially ninety degrees around from the arm 19 to form the arm 20. The shaft 16 is normally rocked by a spring 21 bearing against a leg 22 fixed to the shaft to have the arm 19 carried upwardly against the arm 15 so as to yieldingly retain the bail 14 in the downturned position as shown in Figs. 1, 2 and 3.

The spool 23 is provided with the usual bell-shaped end flanges which run in close proximity to the respective head and tail plates. The end of the shaft of the spool which passes through the head plate 12 is formed between the flange and the plate to be square in cross section as at 24. That part of the shaft which extends on through the plate 12 carries the usual pinion gear 25 and is supported as to radial loads by passing through the bearing portion 26. A spider 27 is placed between the spool flange 28 and the head plate 12 and there secured by a number of feet 29 here shown as three in number. The spider 27 is in reality a flat plate with a central hole sufficiently large to permit the square shaft 24 to pass therethrough and revolve free of contact with the plate. The plate is spaced inwardly from the head plate 12 a distance to receive therebetween a friction disk 30 and a pressure plate 31 with sufficient room to spare to allow the disk 30 and plate 31 to be shifted a short distance. A clearance is provided between the plate of the spider 27 and the flange 28 of the spool. The friction disk 30 has a square hole through its center of sufficient size to permit the disk being fitted on the square shaft 24 on the spool so that the disk is revolved with the shaft. The pressure plate 31 is provided with an enlarged hole through its center to clear the shaft and this plate is centrally supported about the shaft 24 by the two pins 32 and 33 which have their inner ends fixed to the plate and slidably pass out through the head plate 12. Not only is the pressure plate 31 held centrally about the shaft 24 and out of contact therewith by these pins, but it is also held against rotation.

On the outer face of the head plate 12 is rockably mounted a lever 34 to pivot on the pin 35 with a single arm extending over the downturned arm 20 of the shaft 16 and extending by a double arm to around the bearing 26 to engage the pins 32 and 33. By pressing the outer or single arm of the lever 34 toward the plate 12 the lever 34 is thus rocked to have the double-armed end pull outwardly on the pins 32 and 33 to correspondingly shift the plate 31 toward the inner face of the head plate 12. The friction disk 30 is free to slide longitudinally along the shaft 24 although it is revolubly carried thereby. A spring 36 normally urges the single arm of the lever 34 against the downturned arm 20. A screw 37 is screwthreadedly carried in the outer end of the single arm of the lever 34 to have a head positioned to bear against the arm 20 and an outer end to extend to through the head cap 38 to receive a nut 39 thereon in such a manner that rotation of the nut 39 will revolve the screw 37 whereby the lever 34 may be adjustably rocked by varying the distance of the head of the screw from the back side of the lever 34.

The springs 21 and 36 exert but very little pressure and keep the various members rocked into contact with adjacent members so as to prevent lost motion. The bail 14 is employed in the customary manner to be rocked by a line (not shown) in the act of casting. In casting the line the line runs out from the spool 23 to be taut to lift the bail 14 to some such position as indicated by the dash lines in Fig. 2. Immediately the bait being cast loses its momentum, the tautness of the line is decreased and consequently the bail 14 is allowed to drop as permitted by the slack in the line.

As the bail 14 may be rocked upwardly by the line when it is running free in leaving the spool, the arm 15 presses downwardly on the arm 19 to rock the shaft 16 and in turn rock the arm 20 around toward the head plate 12 away from the head of the screw 37. This rocking of the arm 20 permits the spring 36 to cause the lever 34 to rock around accordingly and thus pull outwardly on the pins 32 and 33 to shift the pressure plate 31 toward the head plate 12 and thus allow the friction disk 30 to be carried freely between the pressure plate and the spider 27 as the spool revolves. In this manner, it is to be seen that a free running spool is provided without any drag or brake being applied thereto. Now should the least slack develop in the line against which the bail 14 rests, the bail will drop downwardly to rock the arm 15 upwardly to allow the spring 21 to rock the shaft 16 to have the arm 19 follow upwardly against the arm 15. Now as the shaft 16 thus rocks, the arm 20 is carried outwardly toward the head of the screw 37. Now by suitably adjusting the position of the head of the screw 37 from the back side of the lever 34, the arm 20 will be brought against the head of the screw 37 to push it outwardly just the desired amount as will cause the lever 34 to rock and push inwardly on the pins 32, 33 to carry the pressure plate 31 back to bear against the friction disk 30 to press it against the face of the spider 27. Thus by suitably adjusting the nut 39 on the screw 37 the desired drag or brake action may be applied to the spool 23 to slow it down and stop it before the spool can over-run and start winding the line back in the opposite direction to cause a back-lash. Of course the screw 37 may be adjusted to give a light drag action or a harsher brake action. The spring 36 is so proportioned as to be overcome by the spring 21, and in fact the spring 36 may be entirely dispensed with although it is preferable to employ it to obtain a quicker release of the plate 31 from the disk 30.

The disk 30 while as above indicated is fitted to the squared portion 24 of the reel shaft to be revolved therewith and to be slidable longitudinally therealong, is freely fitted to the shaft so that although the disk 30 may be tightly gripped between the pressure plate 31 and the spider 27, the shaft may still be free to move longitudinally through the disk 30 and no end thrust is transmitted to the shaft in any way so that the flanges of the spool are not pressed against either the head or tail plates.

Another feature of my invention is to be found in the brake or drag release means which may be operated without having to disturb the adjustment of the screw 37. In applying this feature, I provide a lever 40 pivotally carried by the screw 41 on the outer face of the tail plate 13 and formed in an arcuate shape to follow somewhat the contour of the periphery of the plate and to extend around forwardly to be slidably engaged by a screw 42 passed through the slot 43 formed in the lever. The two screws 41, 42 screwthreadedly engage the plate 13. On the end of the shaft 11 which is carried through the tail plate 13 is fixed a dog 44. This dog 44 is located about the shaft 11 to bear against the end of the lever 40 and normally hold it in an upper position as indicated by the solid lines when the bail 14 is in the lowered position. In this position the lever 40 extends beyond the periphery of the plate 13 a distance such that it may be readily pressed downwardly by the palm or the thumb of the operator so as to rock the dog 44 down and thereby lift the bail 14 to in turn cause the arm 15 to rock the shaft 16 against the pressure of the spring 21 and thus relieve the pressure through the lever 34 of the plate 31 against the disk 30. The spring 21 will again return the bail 14 and the lever 40 to their normally inoperative positions when the lever 40 is released.

While I have here shown and described my invention in the best form as now known to me it is obvious that structural changes may be made without departing from the spirit of the invention and I, therefore, do not desire to be limited to that precise form beyond the limitations as may be imposed by the following claims.

I claim:

1. In a braking device, a rotatable member to be braked, a shaft fixed to turn with said member, a stationary plate fixed relative to said member about said shaft, a friction disk adjacent said plate and carried on said shaft to be driven thereby and slidable longitudinally of the shaft, a rockable lever carried by a support fixed relative to said shaft, a pressure plate adapted to be shifted against said friction disk to carry the disk against said stationary plate, said pressure plate having a clearance hole through which said shaft extends, connecting pins between the pressure plate and said lever, means holding said pressure plate against rotation, and means for rocking said lever to shift said pressure plate toward and away from said disk.

2. In a fishing reel, an anti-back-lash mechanism comprising in combination with a line spool, head and tail plates, a spool shaft revolubly carrying the spool between the plates, and a bail rockably carried between the said two plates, a shaft carrying said bail and revolubly extending through one of said plates, a lever arm on the extended end of the shaft, a second shaft rockably carried by the said one plate, a lever arm on the second shaft in the path of the bail shaft arm, a spider fixed to said one plate to extend around and out of contact with said shaft, a friction disk carried longitudinally slidable on the shaft but fixed to revolve therewith between the plate and the spider, a pressure plate adjacent said disk and through which said shaft freely passes, a lever rockably mounted on said one plate, a second lever arm on said second shaft in the path of one end of said lever, connecting means between the other end of said lever and said pressure plate to transmit motion of the lever end to the plate, and spring means yieldingly rocking the second shaft to carry both of its arms respectively toward said first shaft arm and said lever.

3. In a fishing reel, an anti-back-lash mechanism comprising in combination with a line spool, head and tail plates, a spool shaft revolubly carrying the spool between the plates, and a bail rockably carried between the said two plates, a shaft carrying said bail and revolubly extending through one of said plates, a lever arm on the extended end of the shaft, a second shaft rockably carried by the said one plate, a lever arm on the second shaft in the path of the bail shaft arm, a spider fixed to said one plate to extend around and out of contact with said shaft, a friction disk carried longitudinally slidable on the shaft but fixed to revolve therewith between the plate and the spider, a pressure plate adjacent said disk and through which said shaft freely passes, a lever rockably mounted on said one plate, a second lever arm on said second shaft in the path of one end of said lever, connecting means between the other end of said lever and said pressure plate to transmit motion of the lever end to the plate, and spring means yieldingly rocking the second shaft to carry both of its arms respectively toward said first shaft arm and said lever, and a screw carried by the lever adapted to be advanced toward and withdrawn from said second lever arm.

4. In a fishing reel, a spool, a spool shaft, head and tail plates revolubly carrying the shaft, a bail rockably carried between said plates, a friction disk carried by said shaft to revolve therewith and to be slidable longitudinally therealong, means carried by one of said plates to engage said disk without said disk engaging said spool, a lever for actuating said means, connecting means between said bail and said lever, and spring means yieldingly holding said bail in a down-turned position and said lever in an actuated position.

5. In a fishing reel, a spool, a spool shaft, head and tail plates revolubly carrying the shaft, a bail rockably carried between said plates, a friction disk carried by said shaft to revolve therewith and to be slidable longitudinally therealong, means carried by one of said plates to engage said disk without said disk engaging said spool, a lever for actuating said means, connecting means between said bail and said lever, and spring means yieldingly holding said bail in a down-turned position and said lever in an actuated position, and lever means for rocking said bail to overcome said spring means.

6. In a fishing reel, a spool, a spool shaft, head and tail plates revolubly carrying the shaft, a bail rockably carried between said plates, a friction disk carried by said shaft to revolve therewith and to be slidable longitudinally therealong, means carried by one of said plates to engage said disk without said disk engaging said spool, a lever for actuating said means, connecting means between said bail and said lever, and spring means yieldingly holding said bail in a down-turned position and said lever in an actuated position, an adjustable member between said lever and said connecting means adapted to vary the distance therebetween.

7. In a fishing reel, a spool, a spool shaft, head and tail plates revolubly carrying the shaft, a bail rockably carried between said plates, a friction disk carried by said shaft to revolve therewith and to be slidable longitudinally therealong, means carried by one of said plates to engage said disk without said disk engaging said spool, a lever for actuating said means, connecting means between said bail and said lever, and spring means yieldingly holding said bail in a down-turned position and said lever in an actuated position, an adjustable member between said lever and said connecting means adapted to vary the distance therebetween, and lever means for rocking said bail to overcome said spring means without change in adjustment of said member.

8. In a fishing reel brake control, a spool, a shaft carrying the spool, head and tail plates revolubly carrying the spool, a brake plate fixed to one of said plates and spaced therefrom, a shiftable pressure plate between the brake plate and said one plate, a friction disk between the pressure plate and the brake plate, said shaft extending freely through said pressure and brake plates and said disk being engaged by the shaft but slidable therealong, a bail rockably carried by said head and tail plates, spring means yieldingly resisting the lifting of the bail, and shifting means interposed between said bail and said pressure plate whereby lifting of the bail will shift the pressure plate away from said disk, and lowering of the bail will permit the plate to move toward the disk.

9. In a fishing reel spool brake, a spool shaft, a rockable bail, a plate fixed relative to the shaft, a friction disk carried by the shaft to be revolved therewith but longitudinally slidable therealong, a pressure plate adjacent the disk adapted to be shifted to carry the disk against said fixed plate, a pressure plate shifting lever, rocking means between the bail and the lever, and spring means yieldingly holding said lever in a pressure plate shifted position engaging said disk and holding said bail in a predetermined position, the rocking of the bail from said position shifting said rocking means to overcome said spring means and release said lever.

10. In a fishing reel spool brake, a spool shaft, a rockable bail, a plate fixed relative to the shaft, a friction disk carried by the shaft to be revolved therewith but longitudinally slidable therealong, a pressure plate adjacent the disk adapted to be shifted to carry the disk against said fixed plate, a pressure plate shifting lever, rocking means between the bail and the lever, and spring means yieldingly holding said lever in a pressure plate shifted position engaging said disk and holding said bail in a predetermined position, the rocking of the bail from said position shifting said rocking means to overcome said spring means and release said lever, and screw means adjustably changing the initial position of said lever whereby the degree of pressure of said pressure plate against said disk may be varied.

11. In a fishing reel spool brake, a spool shaft, a rockable bail, a plate fixed relative to the shaft, a friction disk carried by the shaft to be revolved therewith but longitudinally slidable therealong, a pressure plate adjacent the disk adapted to be shifted to carry the disk against said fixed plate, a pressure plate shifting lever, rocking means between the bail and the lever, and spring means yieldingly holding said lever in a pressure plate shifted position engaging said disk and holding said bail in a predetermined position, the rocking of the bail from said position shifting said rocking means to overcome said spring means and release said lever, and screw means adjustably changing the initial position of said lever whereby the degree of pressure of said pressure plate against said disk may be varied, and means for relieving the pressure of the plate against the disk independently of said screw means.

In testimony whereof I affix my signature.

CHESTER E. SMELSER.